(12) United States Patent
Walker et al.

(10) Patent No.: US 10,963,164 B2
(45) Date of Patent: Mar. 30, 2021

(54) NON-DETERMINISTIC MEMORY PROTOCOL

(71) Applicant: Micron Technology, Inc., Boise, ID (US)

(72) Inventors: Robert M. Walker, Raleigh, NC (US); James A. Hall, Jr., Boise, ID (US); Frank F. Ross, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/723,589

(22) Filed: Dec. 20, 2019

(65) Prior Publication Data

US 2020/0125259 A1 Apr. 23, 2020

Related U.S. Application Data

(63) Continuation of application No. 16/115,004, filed on Aug. 28, 2018, now Pat. No. 10,678,441, which is a
(Continued)

(51) Int. Cl.
*G06F 3/06* (2006.01)
*G06F 12/00* (2006.01)
(Continued)

(52) U.S. Cl.
CPC ............ *G06F 3/061* (2013.01); *G06F 3/0659* (2013.01); *G06F 3/0679* (2013.01);
(Continued)

(58) Field of Classification Search
CPC ...... G06F 3/061; G06F 3/0659; G06F 3/0679; G06F 3/0688; G06F 12/00;
(Continued)

(56) References Cited

U.S. PATENT DOCUMENTS

| 5,140,682 A | 8/1992 | Okura et al. |
| 5,452,311 A | 9/1995 | Wells et al. |

(Continued)

FOREIGN PATENT DOCUMENTS

| EP | 2645263 A2 | 10/2013 |
| JP | 0561748 A | 3/1993 |

(Continued)

OTHER PUBLICATIONS

Office Action from related Taiwanese patent application No. 106114938, dated Nov. 28, 2019, 11 pages.
(Continued)

*Primary Examiner* — Aracelis Ruiz
(74) *Attorney, Agent, or Firm* — Brooks, Cameron & Huebsch, PLLC

(57) ABSTRACT

The present disclosure includes apparatuses and methods related to a non-deterministic memory protocol. An example apparatus can perform operations on the memory device based on commands received from a host according to a protocol, wherein the protocol includes non-deterministic timing of the operations. The memory device can be a non-volatile dual in-line memory module (NVDIMM) device.

16 Claims, 5 Drawing Sheets

Related U.S. Application Data continuation of application No. 15/157,213, filed on May 17, 2016, now Pat. No. 10,152,237.

(60) Provisional application No. 62/332,370, filed on May 5, 2016.

(51) Int. Cl.
    *G06F 12/02* (2006.01)
    *G06F 13/16* (2006.01)

(52) U.S. Cl.
    CPC ............ *G06F 3/0688* (2013.01); *G06F 12/00* (2013.01); *G06F 12/0246* (2013.01); *G06F 13/1626* (2013.01); *G06F 2212/1024* (2013.01); *G06F 2212/7203* (2013.01); *G06F 2212/7208* (2013.01)

(58) Field of Classification Search
    CPC ............ G06F 12/0246; G06F 13/1626; G06F 13/1668; G06F 2212/1024; G06F 2212/7203; G06F 2212/7208
    See application file for complete search history.

(56) References Cited

U.S. PATENT DOCUMENTS

| | | | |
|---|---|---|---|
| 5,561,823 A * | 10/1996 | Anderson | G06F 3/0601 710/1 |
| 5,574,944 A | 11/1996 | Stager | |
| 5,590,345 A | 12/1996 | Barker et al. | |
| 5,774,683 A | 6/1998 | Gulick | |
| 5,915,265 A | 6/1999 | Crocker et al. | |
| 5,937,423 A | 8/1999 | Robinson | |
| 6,370,614 B1 | 4/2002 | Teoman et al. | |
| 6,370,619 B1 | 4/2002 | Ho et al. | |
| 7,480,754 B2 | 1/2009 | Priborsky et al. | |
| 7,711,889 B2 | 5/2010 | Kudo et al. | |
| 7,870,351 B2 | 1/2011 | Resnick | |
| 7,904,644 B1 | 3/2011 | Pinvidic et al. | |
| 7,924,521 B1 | 4/2011 | Hudiono et al. | |
| 7,983,107 B2 | 7/2011 | Moshayedi et al. | |
| 8,719,492 B1 | 5/2014 | Asnaashari | |
| 8,769,192 B2 | 7/2014 | Yeh | |
| 8,874,831 B2 | 10/2014 | Lee et al. | |
| 9,104,583 B2 | 8/2015 | Ambroladze et al. | |
| 9,128,634 B1 | 9/2015 | Kang et al. | |
| 2001/0049770 A1 | 12/2001 | Cai et al. | |
| 2002/0062459 A1 | 5/2002 | Lasserre et al. | |
| 2003/0033461 A1 | 2/2003 | Malik et al. | |
| 2003/0110322 A1 | 6/2003 | Wolrich et al. | |
| 2004/0148482 A1 | 7/2004 | Grundy et al. | |
| 2004/0205296 A1 | 10/2004 | Bearden | |
| 2004/0260908 A1 | 12/2004 | Malik et al. | |
| 2005/0160320 A1 | 7/2005 | Elez | |
| 2005/0273549 A1 | 12/2005 | Roohparvar | |
| 2006/0015683 A1 | 1/2006 | Ashmore et al. | |
| 2006/0242332 A1 | 10/2006 | Johnsen et al. | |
| 2007/0002612 A1 | 1/2007 | Chang et al. | |
| 2007/0233990 A1 | 10/2007 | Kuczynski et al. | |
| 2008/0082751 A1 | 4/2008 | Okin et al. | |
| 2008/0162735 A1 | 7/2008 | Voigt et al. | |
| 2008/0189452 A1 | 8/2008 | Merry et al. | |
| 2008/0195800 A1 | 8/2008 | Lee et al. | |
| 2008/0270678 A1 | 10/2008 | Cornwell et al. | |
| 2009/0006787 A1 | 1/2009 | De Souza et al. | |
| 2009/0133032 A1 | 5/2009 | Biles et al. | |
| 2009/0138665 A1 | 5/2009 | Suzuki | |
| 2009/0164869 A1 | 6/2009 | Chuang | |
| 2009/0276556 A1 | 11/2009 | Huang | |
| 2010/0077175 A1 | 3/2010 | Wu et al. | |
| 2010/0115142 A1 | 5/2010 | Lim | |
| 2010/0250827 A1 | 9/2010 | Jullien et al. | |
| 2010/0312950 A1 | 12/2010 | Hsieh | |
| 2010/0318742 A1 | 12/2010 | Plondke et al. | |
| 2011/0170346 A1 | 7/2011 | Nagai et al. | |
| 2011/0268256 A1 | 11/2011 | Ootsuka | |
| 2011/0320651 A1 | 12/2011 | Poublan et al. | |
| 2012/0020161 A1 | 1/2012 | Haukness | |
| 2012/0131253 A1 | 5/2012 | McKnight et al. | |
| 2012/0159052 A1 | 6/2012 | Lee et al. | |
| 2012/0278664 A1 | 11/2012 | Kazui et al. | |
| 2013/0019057 A1 | 1/2013 | Stephens | |
| 2013/0060981 A1 | 3/2013 | Horn et al. | |
| 2013/0212319 A1 | 8/2013 | Hida et al. | |
| 2013/0262745 A1 | 10/2013 | Lin et al. | |
| 2013/0262761 A1 | 10/2013 | Oh | |
| 2014/0032818 A1 | 1/2014 | Chang et al. | |
| 2014/0047206 A1 | 2/2014 | Ochiai | |
| 2014/0108714 A1 | 4/2014 | Lee et al. | |
| 2014/0229699 A1 | 8/2014 | Gurgi et al. | |
| 2014/0237157 A1 | 8/2014 | Takefman et al. | |
| 2014/0269088 A1 | 9/2014 | Pichen | |
| 2014/0344512 A1 | 11/2014 | Nishioka | |
| 2014/0351492 A1 | 11/2014 | Chen | |
| 2015/0006794 A1 | 1/2015 | Kang et al. | |
| 2015/0012687 A1 | 1/2015 | Huang et al. | |
| 2015/0052318 A1 | 2/2015 | Walker | |
| 2015/0067291 A1 | 3/2015 | Miyamoto et al. | |
| 2015/0212738 A1 | 7/2015 | D'eliseo et al. | |
| 2015/0234601 A1 | 8/2015 | Tsai | |
| 2015/0279463 A1 | 10/2015 | Berke | |
| 2015/0331638 A1 | 11/2015 | Zaltsman et al. | |
| 2015/0363106 A1 | 12/2015 | Lim et al. | |
| 2015/0378886 A1 | 12/2015 | Nemazie et al. | |
| 2016/0026577 A1 | 1/2016 | Goodwin | |
| 2016/0041907 A1 | 2/2016 | Jung et al. | |
| 2016/0070483 A1 | 3/2016 | Yoon et al. | |
| 2016/0118121 A1 | 4/2016 | Kelly et al. | |
| 2016/0232112 A1 | 8/2016 | Lee | |
| 2016/0306566 A1 | 10/2016 | Lu et al. | |
| 2016/0342487 A1 | 11/2016 | Ware et al. | |
| 2016/0357481 A1 * | 12/2016 | Nam | G06F 3/0619 |
| 2017/0024297 A1 | 1/2017 | Sogabe | |
| 2017/0160929 A1 | 6/2017 | Ayandeh | |
| 2017/0308306 A1 | 10/2017 | Intrater | |
| 2017/0351433 A1 | 12/2017 | Walker et al. | |
| 2018/0260329 A1 | 9/2018 | Galbraith et al. | |

FOREIGN PATENT DOCUMENTS

| | | |
|---|---|---|
| TW | 201013400 A | 4/2010 |
| TW | I363299 B | 5/2012 |
| TW | 201314437 A | 4/2013 |
| WO | 2010002753 A1 | 1/2010 |
| WO | 2013007870 A1 | 1/2013 |
| WO | 2015116468 A1 | 8/2015 |

OTHER PUBLICATIONS

Communication Pursuant to Article 94(3) EPC from related European patent application No. 17793026.0, dated Dec. 17, 2019, 4 pages.
Second Office Action from related Chinese patent application No. 201780026941.4, dated Feb. 26, 2020, 15 pages.
Office Action from related Taiwan patent application No. 106114938, dated Mar. 11, 2020, 12 pages.
International Search Report and Written Opinion from international application No. PCT/US2018/014345, dated Jun. 22, 2018, 15 pp.
International Search Report and Written Opinion from international application No. PCT/US2018/018106, dated May 28, 2018, 19 pp.
International Search Report and Written Opinion from international application No. PCT/US2018/018124, dated Jun. 1, 2018, 14 pp.
Decision of Rejection from related Taiwanese patent application No. 106114938, dated May 24, 2018, 6 pp.
Office Action from Taiwanese patent application No. 106118556, dated May 11, 2018, 10 pp.
Office Action from related Taiwanese patent application No. 106114938, dated Jan. 18, 2018, 7 pp.
International Search Report and Written Opinion from international patent application No. PCT/US2017/034487, dated Oct. 25, 2017, 22 pp.

(56) References Cited

OTHER PUBLICATIONS

International Search Report and Written Opinion from international application No. PCT/US2017/063581, dated Mar. 19, 2018, 13 pp.
International Search Report and Written Opinion from related international application No. PCT/US2017/029780, dated Jul. 18, 2017, 11 pp.
Office Action from Taiwanese patent application No. 107102386, dated Sep. 12, 2018, 15 pp.
Office Action from Taiwanese patent application No. 106142145, dated Dec. 12, 2018, 16 pp.
Office Action from Taiwanese patent application No. 107108758, dated Jan. 28, 2019, 21 pp.
Search Report from related European patent application No. 17793026.0, dated Mar. 13, 2019, 7 pp.
Office Action from related Chinese patent application No. 201780026941.4, dated Jul. 10, 2019, 12 pp.
Office Action from related Taiwan patent application No. 107108757, dated Nov. 8, 2019, 13 pp.

\* cited by examiner

NON-DETERMINISTIC MEMORY PROTOCOL

PRIORITY INFORMATION

This application is a Continuation of U.S. application Ser. No. 16/115,004, filed on Aug. 28, 2018, now granted as U.S. Pat. No. 10,678,441 on Jun. 9, 2020, which is a Continuation of U.S. application Ser. No. 15/157,213, filed May 17, 2016, now granted as U.S. Pat. No. 10,152,237 on Dec. 11, 2018, which claims benefit of U.S. Provisional Application No. 62/332,370 filed May 5, 2016, the specifications of which are incorporated herein by reference.

TECHNICAL FIELD

The present disclosure relates generally to memory devices, and more particularly, to apparatuses and methods for a non-deterministic memory protocol.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile, such as DRAM, for example, and/or non-volatile memory, such as Flash memory or RRAM, for example. The DIMMs can be using a main memory in computing systems.

DETAILED DESCRIPTION

Figure 1:
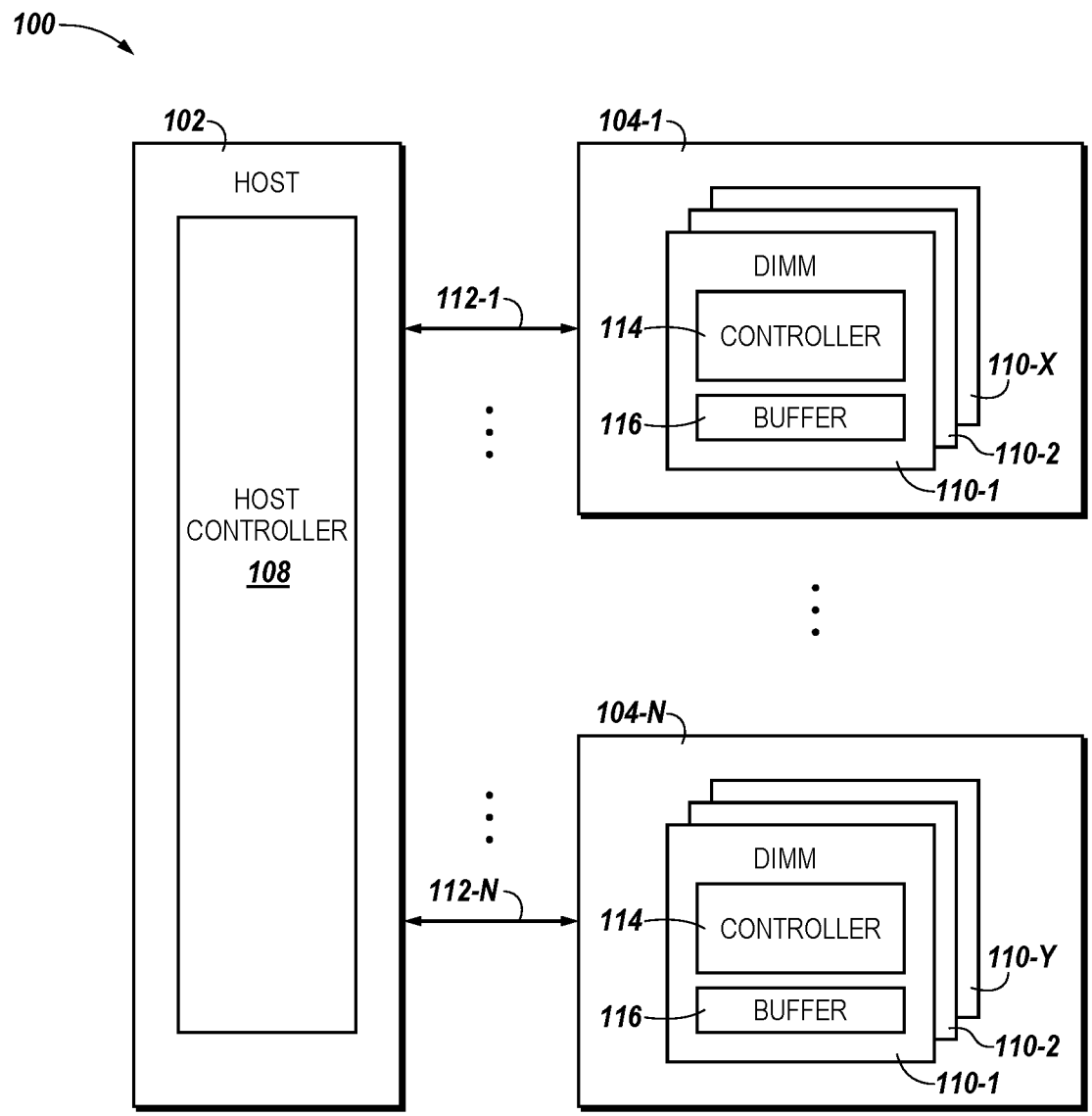
FIG. 1 is a block diagram of an apparatus in the form of a computing system including a memory system in accordance with a number of embodiments of the present disclosure.

The present disclosure includes apparatuses and methods related to a non-deterministic memory protocol. An example apparatus can perform operations on the memory device based on commands received from a host according to a protocol, wherein the protocol includes non-deterministic timing of the operations. The memory device can be a non-volatile dual in-line memory module (NVDIMM) device, for example.

In one or more embodiments of the present disclosure, a protocol can be used for executing operations on a NVDIMM device. The protocol can allow a host to have direct access to the NVDIMM device, therefore a host can send commands to the NVDIMM device for the NVDIMM device to execute. The non-volatile nature of the NVDIMM device can allow the NVDIMM device to execute the commands from a host with non-deterministic timing. The protocol can be used by the host and the NVDIMM to send, receive, and execute commands. The protocol can include signals that enable non-deterministic timing of execution of the commands, returning data associated with read commands in an order that is different than an order in which the read commands were issued, and using a write buffer, cache, or similar entity when executing a write command. Also, the protocol according to embodiments of the present disclosure can be used (e.g., is compatible) with previous protocols so that a host can send commands using the protocol of the present disclosure and other previous protocols to DIMM devices on a same channel. For example, a host can send commands using the protocol according to embodiments of the present disclosure to a NVDIMM device and also send commands using previous protocols to a DDR4 SDRAM device on the same channel.

The signals included in the protocol of the present disclosure can be a read ready (R_RDY) signal, a read send (R_SEND) signal, a write credit increment (WC_INC) signal, and a read identification (RID) signal. The read ready signal can be sent from the NVDIMM device to the host to indicate that the NVDIMM device has the data associated with a read command ready to send to the host. The read send command can be sent from the host to the NVDIMM device in response to receiving a read ready command to indicate that the host is ready to receive the data associated with a read command. The read identification (RID) signal can be sent from the NVDIMM device to the host when the data associated with a read command is being transfers to the host. The RID signal can be used by the host to identify which read command is associated with the data that is being transferred to the host from the NVDIMM device. The write credit increment signal can be sent from the NVDIMM device to the host in response to completing execution of a write command or that a write in the write buffer has been consumed, which indicates the write buffer space associated with the request is available. The write increment signal can be used by the host to increment the number of available write commands that can be sent to the NVDIMM device. For example, when each time the host sends a write command to an NVDIMM device the host decrements the number of available write commands that can be sent to the NVDIMM device and when the host receives the write count increment signal from the NVDIMM device the host can increment the number of available write commands that can be sent to the NVDIMM device.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. Additionally, designators such as "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a functional block diagram of a computing system 100 including an apparatus in the form of a number of memory systems 104-1 . . . 104-N, in accordance with one or more embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, memory systems 104-1 . . . 104-N can include a one or more dual in-line memory modules (DIMM) 110-1, . . . , 110-X, 110-Y. The DIMMs 110-1, . . . , 110-X, 110-Y can include volatile memory and/or non-volatile memory. In a number of embodiments, memory systems 104-1, . . . , 104-N can include a multi-chip device. A multi-chip device can include a number of different memory types and/or memory modules. For example, a memory system can include non-volatile or volatile memory on any type of a module. The examples described below in association with FIGS. 1-4 use a DIMM as the memory module, but the protocol of the present disclosure can be used on any memory system where memory can execute non-deterministic commands. In FIG. 1, memory system 104-1 is coupled to the host via channel 112-1 can include DIMMs 110-1, . . . , 110-X, where DIMM 110-1 is a NVDIMM and 110-X is DRAM DIMM. In this example, each DIMM 110-1, . . . , 110-X, 110-Y includes a controller 114. Controller 114 can received commands from host 102 and control execution of the commands on a DIMM. Also, in a number of embodiments, the protocol of the present disclosure could be implemented by a memory device (e.g., a DIMM) without a controller and execution of the commands using the protocol of the present disclosure could be built into the memory device. The host 102 can send commands to the DIMMs 110-1, . . . , 110-X, 110-Y using the protocol of the present disclosure and/or a prior protocol, depending on the type of memory in the DIMM. For example, the host can use the protocol of the present disclosure to communicate on the same channel (e.g., channel 112-1) with a NVDIMM and a prior protocol to communicate with a DRAM DIMM that are both on the same memory system. The host and the NVDIMM can communicate via read ready (R_RDY) signals, read send (R_SEND) signals, write credit increment (WC_INC) signals, and read identification (RID) signals according the protocol of the present disclosure. The read ready (R_RDY) signals, read send (R_SEND) signals, write credit increment (WC_INC) signals, and read identification (RID) signals can be sent via pins that are unused in a prior protocol (e.g. DDR4) or are pins from a prior protocol (e.g. DDR4) that are repurposed (e.g. used differently) so that the present protocol is compatible with the prior protocol. Also, pins can be assigned to the read ready (R_RDY) signals, read send (R_SEND) signals, write credit increment (WC_INC) signals, and read identification (RID) signals in protocols that are being developed (e.g., DDR5).

As illustrated in FIG. 1, a host 102 can be coupled to the memory systems 104-1 . . . 104-N. In a number of embodiments, each memory system 104-1 . . . 104-N can be coupled to host 102 via a channel. In FIG. 1, memory system 104-1 is coupled to host 102 via channel 112-1 and memory system 104-N is coupled to host 102 via channel 112-N. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Host 102 includes a host controller 108 to communicate with memory systems 104-1 . . . 104-N. The host controller 108 can send commands to the DIMMs 110-1, . . . , 110-X, 110-Y via channels 112-1 . . . 112-N. The host controller 108 can communicate with the DIMMs 110-1, . . . , 110-X, 110-Y and/or the controller 114 on each of the DIMMs 110-1, . . . , 110-X, 110-Y to read, write, and erase data, among other operations. A physical host interface can provide an interface for passing control, address, data, and other signals between the memory systems 104-1 . . . 104-N and host 102 having compatible receptors for the physical host interface. The signals can be communicated between 102 and DIMMs 110-1, . . . , 110-X, 110-Y on a number of buses, such as a data bus and/or an address bus, for example, via channels 112-1 . . . 112-N.

The host controller 108 and/or controller 114 on a DIMM can include control circuitry, e.g., hardware, firmware, and/or software. In one or more embodiments, the host controller 108 and/or controller 114 can be an application specific integrated circuit (ASIC) coupled to a printed circuit board including a physical interface. Also, each DIMM 110-1, . . . , 110-X, 110-Y can include a buffer 116 of volatile and/or non-volatile memory. Buffer 116 can be used to buffer data that is used during execution of read commands and/or write commands. The buffer 116 can be split into a write buffer and a read buffer. The amount of space that is dedicated to the write buffer and the amount of space dedicated to the read buffer can be controlled by the host controller 108. The host can control the amount of space in the buffer 116 dedicated to the write buffer and the read buffer based on the type of commands that are being sent to a particular DIMM. In a number of embodiments, the DIMM can have a fixed write buffer size and/or a fixed read buffer size.

The DIMMs 110-1, ..., 110-X, 110-Y can provide main memory for the memory system or could be used as additional memory or storage throughout the memory system. Each DIMM 110-1, ..., 110-X, 110-Y can include one or more arrays of memory cells, e.g., non-volatile memory cells. The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others.

The embodiment of FIG. 1 can include additional circuitry that is not illustrated so as not to obscure embodiments of the present disclosure. For example, the memory systems 104-1 ... 104-N can include address circuitry to latch address signals provided over I/O connections through I/O circuitry. Address signals can be received and decoded by a row decoder and a column decoder to access the memory devices 110-1, ..., 110-N. It will be appreciated by those skilled in the art that the number of address input connections can depend on the density and architecture of the DIMMs 110-1, ..., 110-X, 110-Y.

Figure 2A:
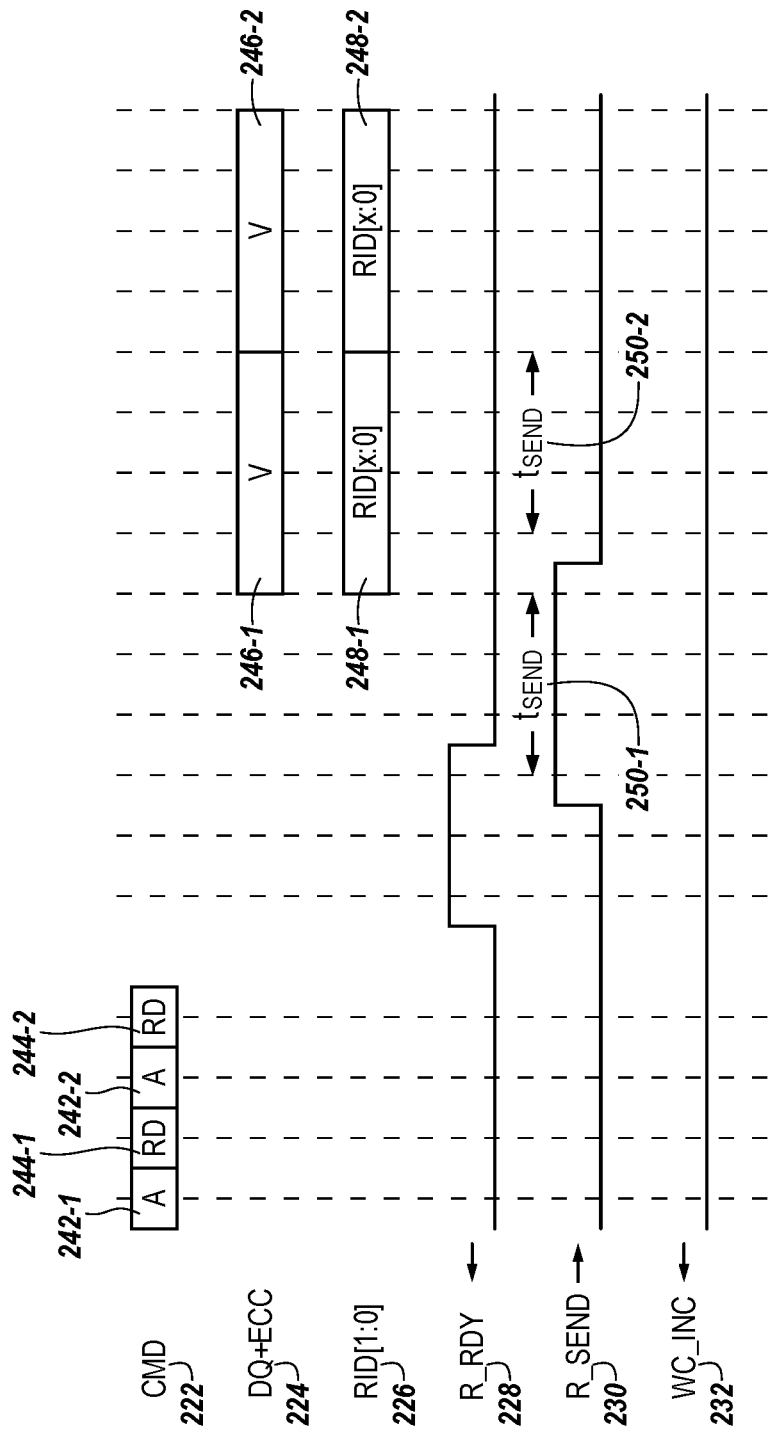
FIGS. 2A-2B are diagrams of a number of reads operations in accordance with a number of embodiments of the present disclosure.
Figure 2B:
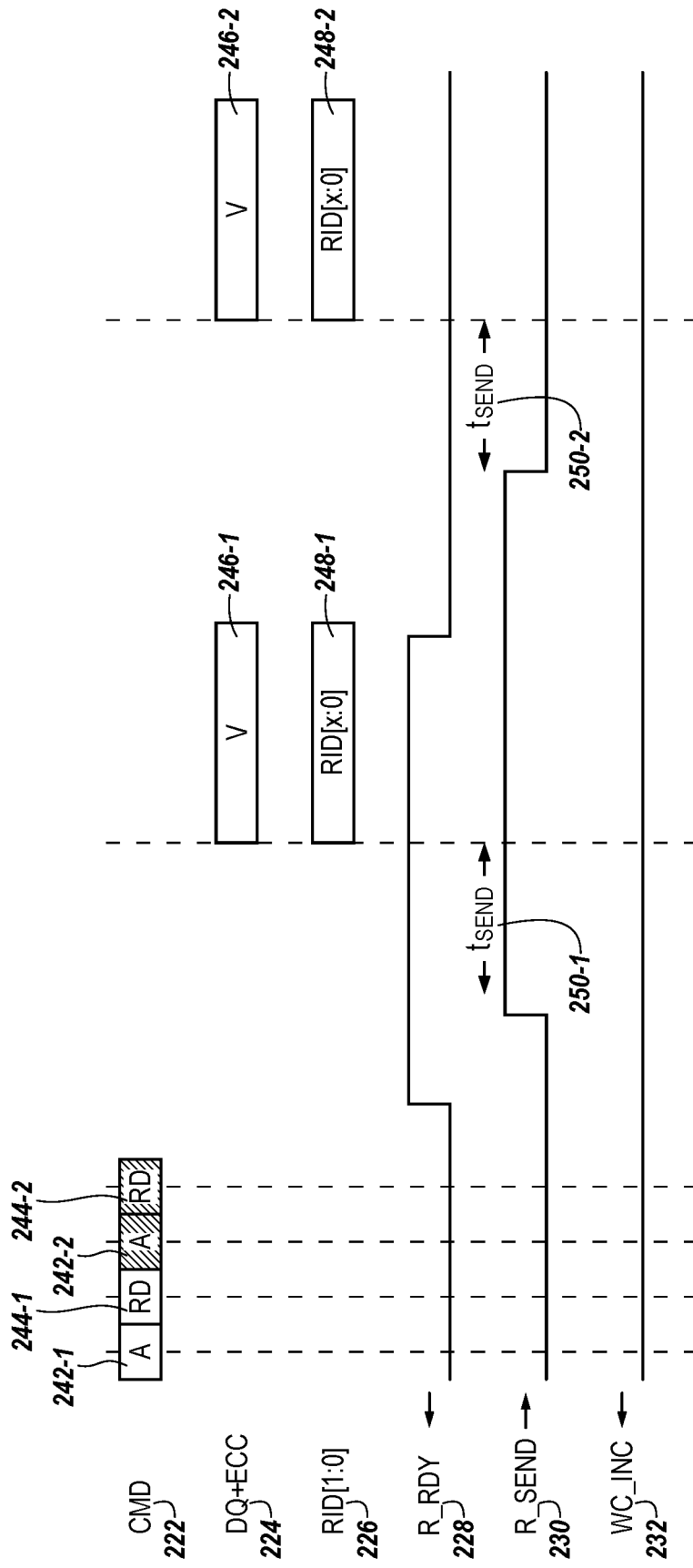

FIGS. 2A-2B are diagrams of a number of reads operations in accordance with a number of embodiments of the present disclosure. FIG. 2A illustrates an example of performing two read operations. A command signal 222 can be sent from the host to the NVDIMM. The command signal can includes an activate command and a read command. In FIG. 2A, a first activate command 242-1, a first read command 244-1, a second activate command 242-2, and a second read command 244-2 are sent from the host to the NVDIMM. In the protocol of the present disclosure, the read commands can be sent one after another without regard to timing parameters. This allows commands to be sent sooner than having to space the commands out due to clock timing parameters, therefore the NVDIMM can start processing the commands sooner which can reduce latency for the commands.

In a number of embodiments, when sending an activate command that is linked and/or is immediately followed by a read command or a write command there may additional redundant bits among the activate command and the read or write command that can be repurposed for additional addressing of the commands. Due to non-volatile memory often having more capacity than DRAM, it may be desirable to have additional addressing of the commands. The bits in the read or write commands that are redundant to bits in the activate command can be used to provide additional row (page) addressing and/or additional column addressing for the read or write commands.

In FIG. 2A, once the NVDIMM has received the read commands 244-1 and 244-2, the NVDIMM can inspect the buffer and/or cache of the NVDIMM and in the non-volatile memory of the NVDIMM to locate the data associated with the read commands 244-1 and 244-2. Once the controller locates the data and has the data ready to send back to the host, the NVDIMM controller can send a read ready command to the host. When a NVDIMM receives a number of read commands, the NVDIMM controller does not have to respond to the read commands in the order in which the NVDIMM receives the read commands. For example, if the NVDIMM controller locates the data associated with a command before it locates data associated with another command that was received prior to the command, the NVDIMM can send a read ready command indicating the data associated with the command is ready to be sent to the host without having to wait for the NVDIMM controller locate the data associated with the another command. Responding to read commands out of order can occur when data associated with read commands is located in the buffer for some, but not all, of the read commands.

In FIG. 2A, a read ready indicator 228 can be sent to the host by toggling (e.g., transitioning) the read ready signal from low to high or high to low to indicate that the data associated with read command 244-1 is ready to be sent to the host. The host can detect the read ready indicator 228 by detecting the transition of the read ready signal. In response to receiving the read ready indicator 228, the host can send a read send indicator 230 to the NVDIMM controller to indicate that the host is ready to receive the data associated with the read command 224-1. The read send indicator 230 can be sent by the host to the NVDIMM controller at any time and without regard to timing parameters. The host can control traffic on the data bus by timing when read send commands are sent to the NVDIMM controller. The read send indicator 230 can include toggling the read send signal from low to high, which is detected by the NVDIMM controller. The NVDIMM controller can, in response to receiving the read send indicator 230, send the data 246-1 associated with write command on the DQ+ECC pins 224. The data 246-1 is sent after a read data transfer time period ($t_{send}$) 250-1. Also, a read identification (RID) signal 248-1 is sent to the host on the RID pins 226 when the data 246-1 sent to the host. The RID signal 248-1 is used to identify the read command associated with the data 246-1 that is sent to the host. Due to the NVDIMM command being able to respond to read commands in an order that is different to the order in which the read commands are received, the host will not know with which read command a particular data transmission is associated without the RID signal. The RID signal can include n-bits, where n is 1 or more bits. For example, the RID signal can be transmitted on a 2 bit RID bus. The number of outstanding reads the host can issue can be dependent on the number of bits in the RID signal, the number of beats in the data packet, and the number of reads the NVDIMM controller can support. For example, if the data burst is 8 beats and the RID signal is 2 bits, the number of outstanding reads that the host can issue is $2^{2*8}$=65,536. Also, a NVDIMM may have a register that can be read by the host to further restrict the number of outstanding read commands that the host can issue and the host can keep track of the number of outstanding reads that the host has issued.

In a number of embodiments, a read send signal can be pulsed from low to high to low to indicate that the host is ready to receive data. The pulsed read send signal can be timed by the host to coordinate with other signals sent to DIMMs on a common channel, which are typically captured with a clock edge, where some of the DIMMs may or may not be using the protocol of the present disclosure.

In response to receiving read command 244-2, a read ready indicator 228 can be sent to the host by toggling the read ready signal from high to low to indicate that the data associated with read command 244-2 is ready to be sent to the host. The host can detect the read ready indicator 228 by detecting the change in the read ready signal from high to low. In response to receiving the read ready indicator 228, the host can send a read send indicator 230 to the NVDIMM controller to indicate that the host is ready to receive the data associated with the read command 224-2. The read send indicator 230 can include toggling the read send signal from high to low, which is detected by the NVDIMM controller. The NVDIMM controller can, in response to receiving the read send indicator 230, send the data 246-2 associated with write command on the DQ+ECC pins 224. The data 246-2 is sent after a read data transfer time period ($t_{send}$) 250-2. Also, a read identification (RID) signal 248-2 is sent to the host on the RID pins 226 when the data 246-2 sent to the host. The RID signal 248-2 is used to identify the read command associated with the data 246-2 that is sent to the host. In a number of embodiments, since the NVDIMM can execute the read commands in any order, data 246-2 and RID signal 248-2 can be sent to the host first in response to the toggling of the read ready command from low to high and data 246-1 and RID signal 248-1 can be sent from the host later in response to the toggling of the read ready command from high to low.

FIG. 2B illustrates an example of performing two read operations, where one of the read operations includes a read hit and the other read operation includes a read miss. A read miss can indicate that the NVDIMM controller was not able to find the data associated with the read command in the buffer of the NVDIMM and a read hit can indicate that the NVDIMM controller was able to find the data associated with the read command in the buffer. In FIG. 2B, a first activate command 242-1, a first read command 244-1, a second activate command 242-2, and a second read command 244-2 are sent from the host to the NVDIMM.

In FIG. 2B, once the NVDIMM has received the read commands 244-1 and 244-2, the NVDIMM can inspect the buffer and/or cache of the NVDIMM and in the non-volatile memory of the NVDIMM to locate the data associated with the read commands 244-1 and 244-2. The data associated with read command 244-1 was a "read hit" and was located in the buffer of the NVDIMM. A read ready indicator 228 can be sent to the host by toggling the read ready signal from low to high to indicate that the data associated with read command 244-1 is ready to be sent to the host. The host can detect the read ready indicator 228 by detecting the change in the read ready signal from low to high. In response to receiving the read ready indicator 228, the host can send a read send indicator 230 to the NVDIMM controller to indicate that the host is ready to receive the data associated with the read command 224-1. The read send indicator 230 can include toggling the read send signal from low to high, which is detected by the NVDIMM controller. The NVDIMM controller can, in response to receiving the read send indicator 230, send the data 246-1 associated with the read command on the DQ+ECC pins 224. The data 246-1 is sent after a read data transfer time period ($t_{send}$) 250-1. Also, a read identification (RID) signal 248-1 is sent to the host on the RID pins 226 when the data 246-1 sent to the host. The RID signal 248-1 is used to identify the read command associated with the data 246-1 that is sent to the host.

In response to receiving read command 244-2, the NVDIMM can inspect the buffer and/or cache of the NVDIMM and in the non-volatile memory of the NVDIMM to locate the data associated with the read commands 244-1 and 244-2. The data associated with read command 244-1 was a "read miss" and was located in the non-volatile memory of the NVDIMM. Due to the read command 244-2 being a "read miss", the NVDIMM controller was not able to send the read ready command as soon as a "read hit" command. After a time period due to locating the data associated with read command 244-2, a read ready indicator 228 can be sent to the host by toggling the read ready signal from high to low to indicate that the data associated with read command 244-2 is ready to be sent to the host. The NVDIMM can wait to send the read ready command until the data associated with the read command is ready to be sent to the host because the read ready command can be sent without regard to timing parameters. The host can detect the read ready indicator 228 by detecting the change in the read ready signal from high to low. In response to receiving the read ready indicator 228, the host can send a read send indicator 230 to the NVDIMM controller to indicate that the host is ready to receive the data associated with the read command 224-2. The read send indicator 230 can include toggling the read send signal from high to low, which is detected by the NVDIMM controller. The NVDIMM controller can, in response to receiving the read send indicator 230, send the data 246-2 associated with write command on the DQ+ECC pins 224. The data 246-2 is sent after a read data transfer time period ($t_{send}$) 250-2. Also, a read identification (RID) signal 248-2 is sent to the host on the RID pins 226 when the data 246-2 sent to the host. The RID signal 248-2 is used to identify the read command associated with the data 246-2 that is sent to the host. In a number of embodiments, priority (e.g., a priority bit can be enabled) can be included in a read command, which indicates to the NVDIMM that the read command should be executed with priority. The NVDIMM can send data associated with a read command with a priority bit enabled before sending data associated with other read commands. In a number of embodiments, since the NVDIMM can execute the read commands in any order, data 246-2 and RID signal 248-2 can be sent to the host first in response to the toggling of the read ready command from low to high and data 246-1 and RID signal 248-1 can be sent from the host later in response to the toggling of the read ready command from high to low.

Figure 3:
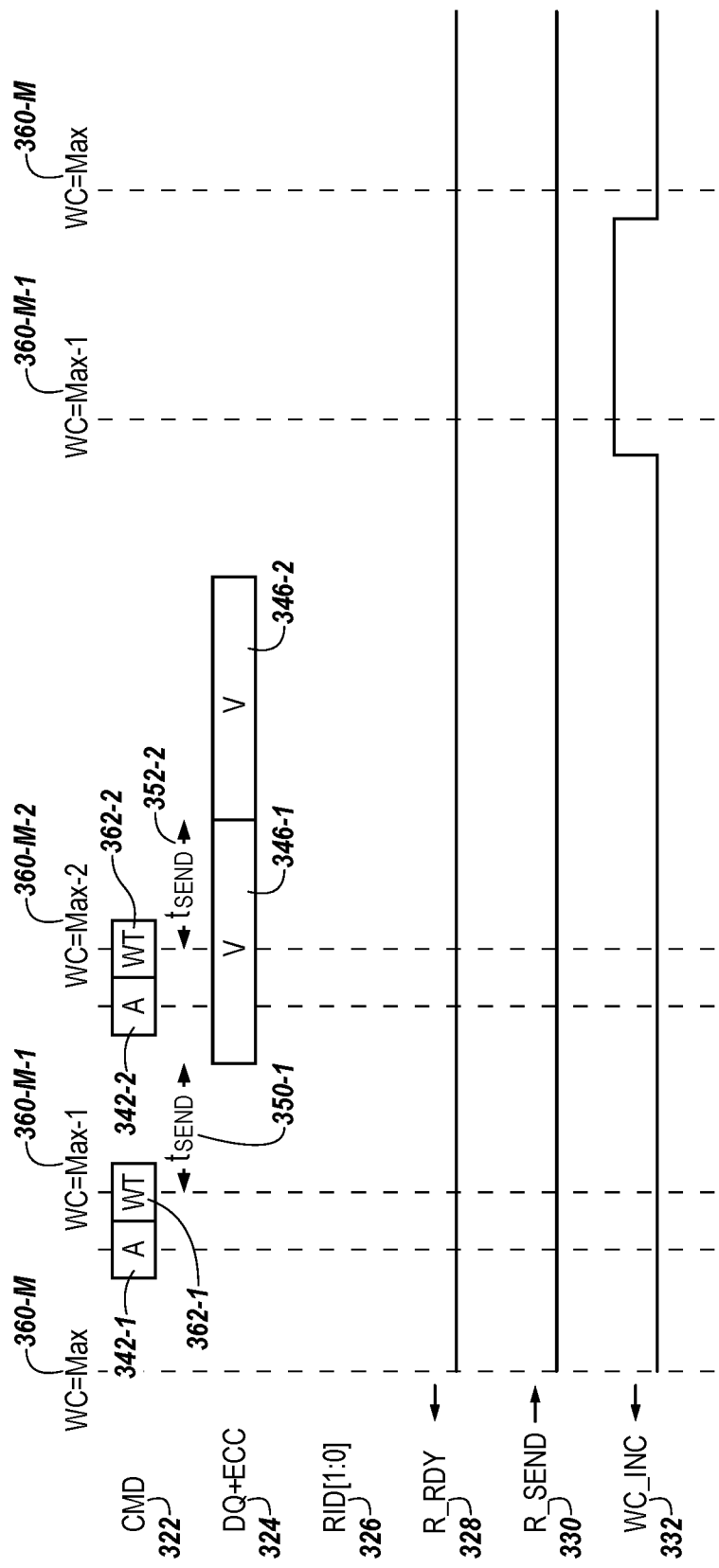
FIG. 3 is a diagram of a number of write operations in accordance with a number of embodiments of the present disclosure.

FIG. 3 is a diagram of a number of write operations in accordance with a number of embodiments of the present disclosure. FIG. 3 illustrates an example of performing two write operations. A command signal 322 can be sent from the host to the NVDIMM. The command signal can includes an activate command and a write command. In FIG. 3, a first activate command 342-1 and a first write command 362-1 are sent from the host to the NVDIMM. The activate command and the write command can be sent without a timing delay between them.

In FIG. 3, once the host has sent the write command 362-1, the host can send the data 346-1 associated with the write command to the NVDIMM after a write data transfer time period ($t_{send}$) 352-2, where data associated with the write command is transfer to the NVDIMM. In the protocol of the present disclosure, a subsequent write command can be sent after the write data transfer time period and while the data associated with a write command is being transferred to the NVDIMM. In FIG. 3, a second activate command 342-2 and a second write command 362-2 are sent from the host to the NVDIMM after write data transfer time period ($t_{send}$) 352-1. Once the host has sent the write command 362-2, the host can send the data 346-2 associated with the write command 362-2 to the NVDIMM after a write data transfer time period ($t_{send}$) 352-2.

A write credit increment (WC_INC) indicator 332 can be used to indicate that write data associated with a write command has been written to a NVDIMM. The write credit increment indicator 332 can be sent from the NVDIMM to the host in response to the NVDIMM retiring the write command from the write buffer and writing data associated with a write command to cache and/or non-volatile memory of the NVDIMM. In embodiments wherein the write credit increment signal is sent from the NVDIMM to the host in response to the NVDIMM writing data associated with a write command to non-volatile memory of the NVDIMM, the write credit increment signal can be used to indicate to the host persistence of the data (e.g., the data is stored in non-volatile memory). In embodiments where the write credit increment command indicates persistence of the data, write commands are executed by the NVDIMM in the order in which the write commands are received by the NVDIMM. Also, the write credit increment signal can be used a write buffer release signal.

In embodiments where the write credit increment command is sent from the NVDIMM to the host in response to the NVDIMM retiring the write command from the write buffer, the write credit increment command does not indicate to the host persistence of the data (e.g., the data is stored in non-volatile memory), while write commands can be executed by the NVDIMM in an order that is different than the order in which the write commands are received by the NVDIMM. For example, the data associated with write command are stored in the buffer and then written to the non-volatile memory of the NVDIMM in an order and time as determined by the NVDIMM controller.

In a number of embodiments, write identification (WID) signal can be sent from the NVDIMM to the host when the write credit increment signal is sent to the host. The WID signal can be used to identify which write commands have complete execution and can be sent of a number of WID pins. The WID signal can be used with a write credit increment signal that indicates persistence of the data to allow the NVDIMM to execute write commands in an order that is different that the order in which the write commands are received.

The number of outstanding write commands that the host can issue can be dependent on the size of the write buffer on the NVDIMM. The size of the write buffer on the NVDIMM can be controlled by the host. The host and the NVDIMM controller can track the number of outstanding write commands that the host can issue. When there are no outstanding write commands issued by the host, the write count is at its maximum. Each time a write command is sent by the host to NVDIMM the host decrements the write counter on the host and each time a write command is received by the NVDIMM from the host the NVDIMM decrements the write counter on the NVDIMM.

In a number of embodiments, two write credit increment signals can be used to keep track of the number of outstanding write commands that the host can issue. For example, a WC_INCv signal can be toggled in response a write command being retired (e.g., released) from the write buffer and a WC_INCnv signal can be toggled in response to a persistent write being completed in non-volatile memory. The WC_INCv and WC_INCNV signals can be sent on different pins. The WC_INCv signals associated with write commands being retired from the write buffer (e.g., the space in the write buffer for the data associated with the write command is free) can be sent to the host in an order that is different than the order in which the host sent the write commands. The WC_INCnv signals associated with persistent writes being completed in non-volatile memory can be sent to the host in the order in which the host sent the write commands.

In FIG. 3, prior to sending a write command the write count is at a maximum (WC=Max) 360-M. In response to sending write command 362-1, the write counter in the host is decremented by 1 (WC=Max−1) 360-M−1. In response to sending the write command 362-2, the write counter in the host is decremented by 1 again (WC=Max−2) 360-M−2. The NVDIMM can also include a write counter that is decremented upon receiving the write commands. Once the NVDIMM has written the data 346-1 associated with write command 362-1 to the buffer and/or non-volatile memory of the NVDIMM, the write count increment indicator 332 can be sent to the host. The write credit increment indicator 332 can toggle the write credit increment signal from low to high to indicate that the data associated with write command 362-1 has been written to the NVDIMM. The host can detect the write count increment indicator 332 by detecting the change in the write credit increment signal from low to high. In response to receiving the write credit increment indicator 332, the host can increment the write counter in the host by 1 (WC=Max−1) 360-M−1. Once the NVDIMM has written the data 346-2 associated with write command 362-2 to the buffer and/or non-volatile memory of the NVDIMM, the write count increment indicator 332 can be sent to the host. The write credit increment indicator 332 can toggle the read ready signal from high to low to indicate that the data associated with write command 362-2 has been written to the NVDIMM. The host can detect the write count increment indicator 332 by detecting the change in the write credit increment signal from high to low. In response to receiving the write credit increment indicator 332, the host can increment the write counter in the host by 1 (WC=Max) 360-M. The NVDIMM can also include a write counter that is incremented upon sending the write credit increment commands.

Figure 4:
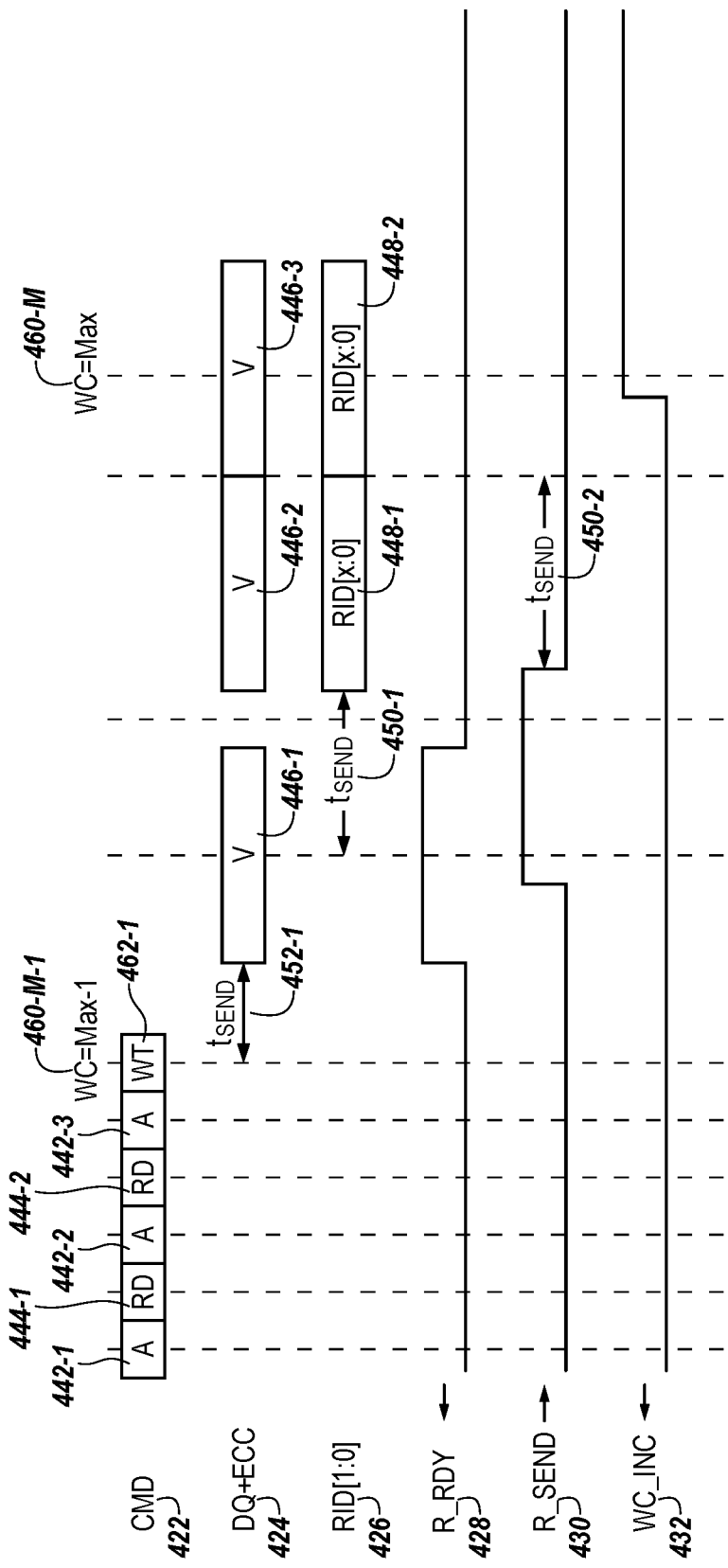
FIG. 4 is a diagram of a number of read and write operations in accordance with a number of embodiments of the present disclosure.

FIG. 4 is a diagram of a number of read and write operations in accordance with a number of embodiments of the present disclosure. FIG. 4 illustrates an example of performing two read operations and a write operation. In FIG. 4, a first activate command 442-1, a first read command 444-1, a second activate command 442-2, and a second read command 444-2, a third activate command 442-3, and a first write command 462-1 are sent from the host to the NVDIMM. In the protocol of the present disclosure, the read commands can be sent one after another and the write command can follow the read commands without regard to timing parameters. This allows commands to be sent sooner than having to space the commands out due to clock timing parameters, therefore the NVDIMM can start processing the commands sooner which can reduce latency for the commands.

In FIG. 4, once the host has sent the write command 462-1, the host can send the data 446-1 associated with the write command to the NVDIMM after a write data transfer time period ($t_{send}$) 452-1. In response to sending write command 462-1, the write counter in the host is decremented by 1 (WC=Max−1) 460-M−1. During the time that the host is sending the data 446-1 associated with write command 462-1, the NVDIMM can inspect the buffer and/or cache of the NVDIMM and in the non-volatile memory of the NVDIMM to locate the data associated with the read commands 444-1 and 444-2. Once the controller has the data associated with read commands ready to send back to the host, the NVDIMM controller can send a read ready command to the host. In FIG. 4, a read ready indicator 428 can be sent to the host by toggling the read ready signal from low to high to indicate that the data associated with read command 444-1 is ready to be sent to the host. The host can detect the read ready indicator 428 by detecting the change in the read ready signal from low to high. In response to receiving the read ready indicator 428, the host can send a read send indicator 430 to the NVDIMM controller to indicate that the host is ready to receive the data associated with the read command 444-1. The read send indicator 430 can be sent by the host to the NVDIMM controller at a time determined by the host. The host can time the read send indicator to avoid data collisions with write data on the data bus. The read send indicator 430 can include toggling the read send signal from low to high, which is detected by the NVDIMM controller. The NVDIMM controller can, in response to receiving the read send indicator 230, send the data 246-2 associated with read command on the DQ+ECC pins 424. The data 246-1 is sent after a read data transfer time period ($t_{send}$) 250-1. Also, a read identification (RID) signal 248-1 is sent to the host on the RID pins 226 when the data 246-1 sent to the host. The RID signal 248-1 is used to identify the read command associated with the data 246-1 that is sent to the host.

Also, once the controller has the data associated with write command 444-2 ready to send back to the host, the NVDIMM controller can send a read ready command to the host. A read ready indicator 428 can be sent to the host by toggling the read ready signal from high to low to indicate that the data 446-3 associated with read command 444-2 is ready to be sent to the host. The host can detect the read ready indicator 428 by detecting the change in the read ready signal from high to low. In response to receiving the read ready indicator 428, the host can send a read send indicator 230 to the NVDIMM controller to indicate that the host is ready to receive the data 446-3 associated with the read command 424-2. The read send indicator 430 can include toggling the read send signal from high to low, which is detected by the NVDIMM controller. The NVDIMM controller can, in response to receiving the read send indicator 430, send the data 446-3 associated with read command 444-2 on the DQ+ECC pins 424. The data 446-2 is sent after a read data transfer time period ($t_{send}$) 250-2. Also, a read identification (RID) signal 248-2 is sent to the host on the RID pins 226 when the data 246-2 sent to the host. The RID signal 248-2 is used to identify the read command associated with the data 246-2 that is sent to the host.

In FIG. 4, the NVDIMM can continue by executing read commands 444-1 and 444-2 while execution of the write command 462-1 is being completed by writing the data 446-1 to the write buffer on the NVDIMM and/or non-volatile memory of the NVDIMM. Once the NVDIMM has written the data 446-1 associated with write command 462-1 to the buffer, cache, and/or non-volatile memory of the NVDIMM, the write count increment indicator 432 can be sent to the host. The write credit increment indicator 432 can toggle the write credit increment signal from low to high to indicate that the data associated with write command 462-1 has been written to the NVDIMM. The host can detect the write count increment indicator 432 by detecting the change in the write credit increment signal from low to high. In response to receiving the write credit increment indicator 432, the host can increment the write counter in the host by 1 (WC=Max) 360-M.

In a number of embodiments, a number of read and write commands can be sent to a NVDIMM. The number of read and write commands can be executed in an order and with a timing that is controlled by the NVDIMM and the host.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving, from a host via a command/address bus of a non-volatile dual inline memory module (NVDIMM), at least one read command and at least one write command;
    receiving, from the host via a data bus of the NVDIMM, data to be written to the NVDIMM;
    transmitting, to the host from a set of pins of the NVDIMM designated for write credit signaling, a write credit signal that is based at least in part on writing the data received from the host; and
    transmitting, to the host via the data bus of the NVDIMM in a same data packet as the write credit signal, data that is responsive to the at least one read command.

2. The method of claim 1, wherein the write credit signal comprises write credit feedback that provides an indication to the host to increment a write credit counter at the host.

3. The method of claim 1, wherein the write credit signal comprises an indication that the at least one write command was executed.

4. The method of claim 1, further comprising:
    receiving the at least one write command at a write buffer of the NVDIMM, wherein the write credit signal comprises an indication of available space in the write buffer.

5. The method of claim 4, further comprising:
    transmitting the write credit signal in response to another command from the host.

6. An apparatus, comprising:
    a command/address bus configured to transmit read and write commands from a host to a volatile memory or a non-volatile memory, or both;
    a data bus configured to communicate data associated with a read or write command between the host and the volatile memory or the non-volatile memory, or both; and
    a set of pins that is separate from the command/address bus is coupled to the volatile memory or the non-volatile memory, or both, and configured to transmit a write credit signal to the host to provide write credit feedback based at least in part on data from the host being written to the volatile memory or the non-volatile memory, or both, wherein the set of pins is configured to transmit the write credit feedback in a same data packet with data communicated on the data bus in response to a read command from the host.

7. The apparatus of claim 6, wherein the set of pins is configured to transmit write credit feedback that comprises an indication to the host to increment a write credit counter at the host.

8. The apparatus of claim 6, wherein the set of pins is configured to transmit write credit feedback that comprises an indication that data from the host communicated via the data bus was written following receipt of at least one write command received from the host via the command/address bus.

9. The apparatus of claim 6, further comprising:
a write buffer coupled to the volatile memory or the non-volatile memory, or both, wherein the set of pins is configured to transmit write credit feedback that comprises an indication of available space in the write buffer.

10. The apparatus of claim 9, wherein the set of pins is configured to transmit write credit feedback in response to another command received from the host via the command/address bus.

11. An apparatus, comprising:
a volatile memory configured as an element of a dual inline memory module (DIMM);
a non-volatile memory configured as an element of the DIMM;
a first bus coupled to the volatile memory or the non-volatile memory, or both, and configured to receive commands or addresses, or both, from a host;
a second bus coupled to the volatile memory or the non-volatile memory, or both, and configured to communicate data between the volatile memory or the non-volatile memory, or both, and the host; and
a set of pins that is different from the first bus and is configured to transmit write credit feedback via a write credit signal from the DIMM to the host based at least in part on data from the host being written to the volatile memory or the non-volatile memory, or both, wherein the second bus and the set of pins are configured to transmit from the DIMM a data packet that comprises write credit feedback and data responsive to a read command received via the first bus.

12. The apparatus of claim 11, further comprising:
a write buffer configured as an element of the DIMM and coupled to the volatile memory or the non-volatile memory, or both, wherein the set of pins is configured to transmit write credit feedback that comprises an indication of available space in the write buffer.

13. A method, comprising:
transmitting, from a host to a non-volatile dual inline memory module (NVDIMM) via a command/address bus, at least one read command and at least one write command;
transmitting, from the host to the NVDIMM via a data bus, data to be written to the NVDIMM;
receiving, at the host from a set of pins of the NVDMM designated for write credit signaling, write credit feedback that is based at least in part on transmitting the data to be written to the NVDIMM; and
receiving, at the host from the NVDIMM, a data packet that comprises the write credit feedback and data responsive to the at least one read command.

14. The method of claim 13, further comprising:
incrementing a write credit counter at the host based at least in part on receiving the write credit feedback.

15. The method of claim 13, wherein the write credit feedback comprises an indication that the at least one write command was executed at the NVDIMM.

16. The method of claim 13, further comprising:
transmitting the at least one write command to a write buffer of the NVDIMM, wherein the write credit feedback comprises and indication of available space in the write buffer.

* * * * *